(12) United States Patent
Hayashi

(10) Patent No.: US 7,188,860 B2
(45) Date of Patent: Mar. 13, 2007

(54) AIRBAG APPARATUS FOR FRONT PASSENGER SEAT

(75) Inventor: Shinji Hayashi, Shiga (JP)

(73) Assignee: Takata Corporation, Tokyo (JP)

( * ) Notice: Subject to any disclaimer, the term of this patent is extended or adjusted under 35 U.S.C. 154(b) by 204 days.

(21) Appl. No.: 10/632,842

(22) Filed: Aug. 4, 2003

(65) Prior Publication Data
US 2004/0041379 A1   Mar. 4, 2004

(30) Foreign Application Priority Data
Sep. 4, 2002   (JP) .............................. 2002-259074

(51) Int. Cl.
*B60R 21/205* (2006.01)
(52) U.S. Cl. .................... 280/728.2; 280/732
(58) Field of Classification Search ............ 280/728.2, 280/728.3, 732, 730.1
See application file for complete search history.

(56) References Cited

U.S. PATENT DOCUMENTS

| | | | | |
|---|---|---|---|---|
| 5,217,253 A | * | 6/1993 | Pray ........................ | 280/728.2 |
| 5,403,033 A | * | 4/1995 | Koma ...................... | 280/728.2 |
| 5,794,967 A | * | 8/1998 | Manire ..................... | 280/728.3 |
| 5,941,558 A | * | 8/1999 | Labrie et al. ............. | 280/728.3 |
| 6,039,342 A | * | 3/2000 | Sasaki ...................... | 280/728.3 |
| 6,076,851 A | * | 6/2000 | Davis, Jr. et al. ........ | 280/728.2 |
| 6,502,851 B2 | | 1/2003 | Kitagawa | |
| 6,595,543 B2 | * | 7/2003 | Desprez ................... | 280/728.2 |

FOREIGN PATENT DOCUMENTS

| | | |
|---|---|---|
| JP | 07-117609 A | 5/1995 |
| JP | 11-321513 A | 11/1999 |
| JP | 2001322523 A  * | 11/2001 |

* cited by examiner

*Primary Examiner*—David R. Dunn
(74) *Attorney, Agent, or Firm*—Foley & Lardner LLP

(57) ABSTRACT

An airbag apparatus for a front passenger seat is configured to be installed on the backside of an instrument panel and to be easily mountable on and detachable from an instrument panel. The airbag apparatus is arranged for easy installation in the instrument panel. The airbag apparatus is fed in below the instrument panel, and upper pieces are inserted into the openings by clamping a leg piece with the upper pieces and a lower piece therebetween. Then, a container is pushed up at a predetermined height, so that a hook is brought into engagement with an opening. Next, bolts are screwed into nuts with openings therebetween, so that the instrument panel and the container are connected together.

11 Claims, 7 Drawing Sheets

AIRBAG APPARATUS FOR FRONT PASSENGER SEAT

BACKGROUND

The present invention relates to a front-passenger-seat airbag apparatus for protecting an occupant sitting on a front passenger seat and its setting structure for installing the airbag apparatus on the backside of an instrument panel.

In a conventional airbag apparatus for a front passenger seat, a folded airbag is accommodated in a container-like casing (i.e., a retainer) and the front opening of the container is covered with a lid. The container is provided with an inflator or gas generator for inflating the airbag arranged therein. The lid may be a lid-like member arranged differently from the instrument panel or may be a region of the instrument panel defined by a tearing line.

A general structure of the airbag apparatus for a front passenger seat having the lid in the region of the instrument panel will be described below with reference to FIG. 7. FIG. 7 is a sectional view showing a conventional airbag apparatus for a front passenger seat and a setting structure thereof in an instrument panel.

The airbag apparatus 100 for a front passenger seat shown in FIG. 7 includes a container 101 having a substantially rectangular shape in plan view, an airbag 102 folded and housed within the container 101, an instrument panel 103 covering an opening on the upper surface of the container 101, a plate 104 interposed between the opening of the container 101 and the instrument panel 103, and a substantially cylindrical inflator 105 for generating gas to inflate the airbag 102.

On the backside of the instrument panel 103, a tearing line (a weakened or fragile portion) 103a is formed. With this tearing line 103a, a region of the instrument panel 103 is partly defined as a lid for covering the opening of the container 101.

The plate 104 is arranged adjacent to the backside of the instrument panel 103 along the region of the instrument panel 103. The plate 104 is configured integrally with the instrument panel 103 and has a connecting piece 104a formed in the peripheral portion of the plate 104 for connecting the container 101 to the instrument panel 103.

On the bottom of the container 101, a semi-circular arc-shaped inflator-accommodating member 106 is arranged, and the inflator 105 is fitted into the accommodating member 106 and a capping member 107 is covered from above on the inflator 105. The capping member 107 has flanges 107a overlapping the bottom surface of the container 101 so that peripheral portions of a gas inlet of the airbag 102 are clamped with between the flanges 107a and the bottom surface of the container 101. The flanges 107a and the accommodating member 106 are integrally fixed to the container 101 with bolts and nuts.

In the periphery of the opening of the container 101, a fixing member 108 used to be fixed to the above-mentioned connecting piece 104a is arranged. The fixing member 108 is provided with an extended portion 108a extending from the external peripheral surface of the container 101 along the bottom surface of the connecting piece 104a, and the extended portion 108a is provided with insertion holes (not shown) formed for inserting bolts or rivets.

The container 101 having the airbag 102 folded and accommodated therein is positioned on the region as the lid from the backside of the instrument panel 103. The extended portion 108a of the fixing member 108 arranged in the periphery of the opening of the container 101 is overlapped with the connecting piece 104a so that the container 101 and the instrument panel 103 are connected together with the connecting piece 104a and the extended portion 108a connected with bolts 108b and nuts 108c.

However, in such an airbag apparatus 100 for a front passenger seat, the container 101 is firmly fixed to the connecting piece 104a along the entire periphery of the opening by the fixing member 108 arranged in the periphery of the opening of the container 101, so that it is difficult to remove the container 101 relative to the instrument panel 103. In particular, it is extremely difficult to release the connection between the bolt 108b and the nut 108c disposed adjacent to a windshield (on the front side of a vehicle body).

Another airbag apparatus, wherein even in a state that the instrument panel is attached to a vehicle body, the container is detachable, is described in Japanese Unexamined Patent Application Publication No. 2001-322523.

FIG. 4 is a longitudinal sectional view of an airbag apparatus for a front passenger seat showing the airbag apparatus for a front passenger seat and its setting structure to an instrument panel according to Japanese Unexamined Patent Application Publication No. 2001-322523; FIG. 5 is a perspective view of the airbag apparatus for a front passenger seat viewed from the upper surface of part of the container; and FIG. 6 is a sectional view showing the engaging relationship between the container part of the airbag apparatus for a front passenger seat and the instrument panel.

This airbag apparatus 1 for a front passenger seat includes a container 2 having a substantially rectangular shape in plan view, an airbag 3 folded and housed within the container 2, a substantially cylindrical inflator 4 for inflating the airbag 3, an instrument panel 5 covering an opening on the upper surface of the container 2, and a plate 6 interposing between the container 2 and the instrument panel 5 and connecting between the container 2 and the instrument panel 5.

On the backside of the instrument panel 5, a tearing line 5a is formed. The instrument panel 5 is provided with a wall portion 7 extending downward along one side face of the container 2. The wall portion 7 is provided with an engagement portion 8 constituted of an opening.

A portion of the plate 6 overlapping with the engagement portion 8 has insertion holes 9 used for inserting retainer members 15 into the engagement portion 8. From an edge of the plate 6 opposite to the wall portion 7, a connecting piece 10 extends for connecting the container 2 to the instrument panel 5. The connecting piece 10 is provided with stud bolts 10a.

The plate 6 has a cleavage section 6a formed at the same position as the tearing line 5a and a hinge (not shown) disposed in the vicinity of the peripheral edge of the plate 6 for rotating the plate 6 like a door. Thereby, when the airbag 3 is inflated so as to push the instrument panel 5 through the plate 6, the plate 6 is cleaved together with the above-mentioned region of the instrument panel 5 and is pushed open toward a vehicle cabin integrally with the region of the instrument panel 5.

On the bottom of the container 2, a semi-circular arc shaped inflator-accommodating member 11 is arranged, and the inflator 4 is fitted into the accommodating member 11 and a capping member 12 is covered from above on the inflator 4. The capping member 12 has flanges 12a overlapping the bottom surface of the container 2 so that peripheral portions of a gas inlet of the airbag 3 are clamped with between the flanges 12a and the bottom surface of the container 2. The flanges 12a are fixed to the container 2 with bolts 13 and nuts 14.

One side of the container 2 extending in the longitudinal direction is provided with the retainer members 15 for engaging with the above-mentioned engagement portion 8. Each of the retainer members 15 includes a connection section 15a connected to the container 2 along the one side and a hook 15b extending from the top of the connection section 15a toward the outside of the container 2 so as to be inserted into the engagement portion 8 with the end portion bent downward along the wall portion 7.

The other side of the container 2 opposite to the above-mentioned one side is provided with fixing members 16 to be fixed to the connecting piece 10 of the plate 6. Each of the fixing members 16 includes a connection section 16a connected to the container 2 along the opposite other side and an extended section 16b extending from the top of the connecting piece 10 toward the outside of the container 2 along the connecting piece 10. The extended sections 16b are provided with insertion holes 16c arranged for inserting the stud bolts 10a of the connecting piece 10.

Upon setting the container 2 in the instrument panel 5, at first, the hooks 15b of the retainer members 15 are inserted into the insertion holes 9 and the engagement portion 8 so that the retainer members 15 is brought into engagement with the engagement portion 8 so as to arrange the one side of the container 2 along the wall portion 7. Then, the extended sections 16b of the fixing members 16, which are provided in the other side opposite to the one side of the container 2 arranged along the wall portion 7, are overlapped with the connecting piece 10 of the plate 6. As a result, the stud bolts 10a are inserted into the insertion holes 16c so as to fix the fixing members 16 to the connecting piece 10 by tightening the nuts 10b from the top end of the stud bolts 10a protruding from the insertion holes 16c toward the bottom surface of the extended sections 16b.

In the airbag apparatus 1 for a front passenger seat and its setting structure constructed as described above, upon setting the container 2 in the instrument panel 5, the side of the container 2 arranged adjacent to a windshield (on the front side of a vehicle body) is attached to the instrument panel 5 with a simplified structure of only the engagement between the locking member 15 and the engagement portion 8, so that the removing of the container 2 from the instrument panel 5 can be easily performed by releasing the fixing of the fixing member 16 arranged in the other side of the container 2 to the connecting piece 10 and by extracting the locking member 15 from the engagement portion 8. As a result, for example, in a state that the instrument panel is kept attached to the vehicle body, the removal of the container can be easily accomplished for maintenance.

However, in the conventional airbag apparatus for a front passenger seat and its setting structure described above and shown FIGS. 4 to 6, after the stud bolts 10a are inserted into the insertion holes 16c, during screwing the nuts 10b to the stud bolts 10a, the instrument panel 5 is liable to escape upward so that there is a slight problem in the tightening operation of the nuts to the stud bolts 10a.

SUMMARY OF THE INVENTION

It is an object of the present invention to provide an airbag apparatus for a front passenger seat and its setting structure in that the connecting operation between an instrument panel and the airbag apparatus for a front passenger seat is distinctly improved.

An airbag apparatus for a front passenger seat according to an embodiment of the present invention includes a container having at least one pair of opposing sides; and an airbag folded and accommodated within the container, one of the pair of the opposing sides having a retainer for retaining an instrument panel while the other having a fixing part for the instrument panel, wherein the fixing part has pieces disposed substantially in parallel with each other, and wherein a wall section extended from the bottom surface of the instrument panel is inserted between the pieces so as to be connectable therebetween.

A setting structure of an airbag apparatus for a front passenger seat according to the present invention includes a structure in that an airbag apparatus for a front passenger seat according to the present invention is attached on the backside of an instrument panel.

According to an embodiment of the present invention, in such an airbag apparatus for a front passenger seat and its setting structure, since the wall section is inserted into an insertion space between the pieces, even during the connection between the pieces and the wall section, the movement of the wall section is restricted by the pieces. Therefore, the operational efficiency connecting between the wall section and the pieces is improved.

According to various embodiments of the present invention, the pieces may preferably extend in a direction connecting between the pair of opposing sides as well as separating from the container. In this case, preferably, the wall section includes an uprising wall standing up from the rear surface of the instrument panel and a leg piece extending from the uprising direction end of the uprising wall substantially in parallel with the instrument panel as well as in a direction separating from the container, the uprising wall being provided with an opening for insertion of one of the pieces, and the leg piece is inserted between the pieces. In such a structure, the relative movement of the instrument panel toward and away from the container is substantially completely blocked by the engagement between the pieces and the leg piece, thereby significantly improving the operational efficiency connecting between the uprising wall and the pieces.

The connection may preferably be performed with the bolts penetrating the pieces and the leg piece. The connection with the bolts is very simple and has a sufficiently high connecting strength.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Embodiments of the present invention will be described below with reference to the drawings.

Figure 1:
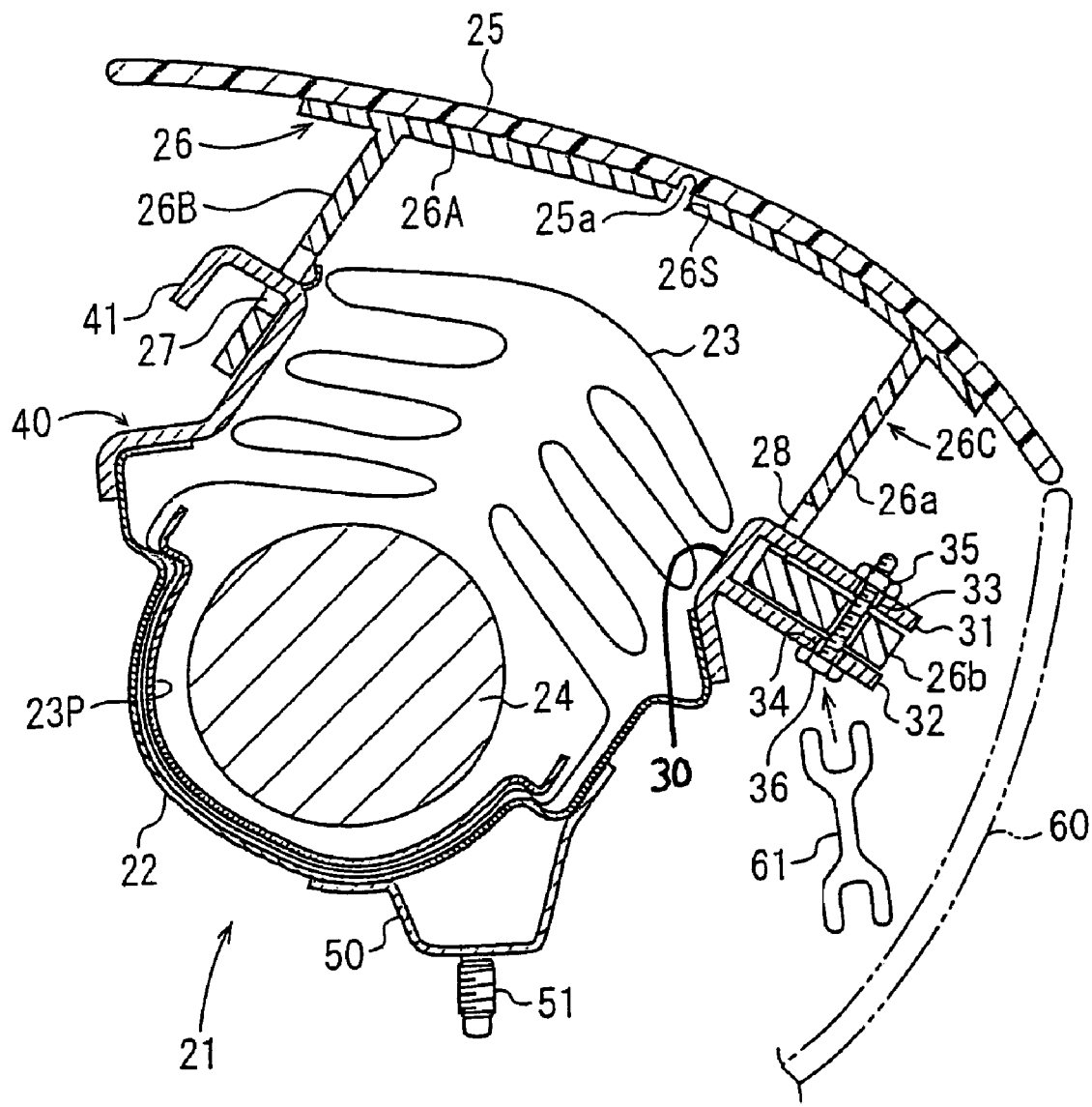
FIG. 1 is a sectional view of an airbag apparatus for a front passenger seat and a setting structure of the airbag apparatus for a front passenger seat according to an embodiment of the present invention.
Figure 2:
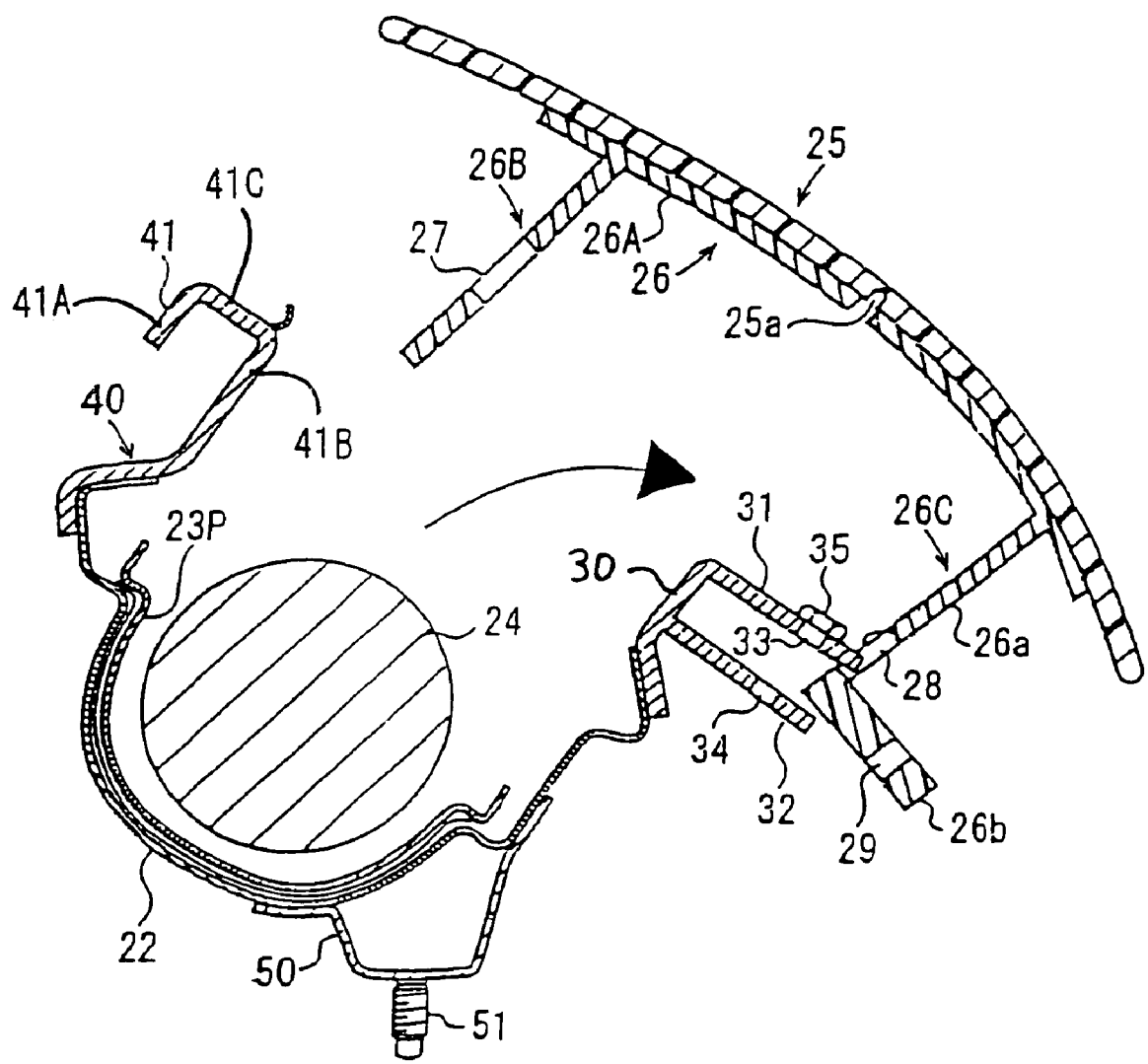
FIG. 2 is an explanatory view for showing setting of the airbag apparatus for a front passenger seat shown in FIG. 1.
Figure 3:
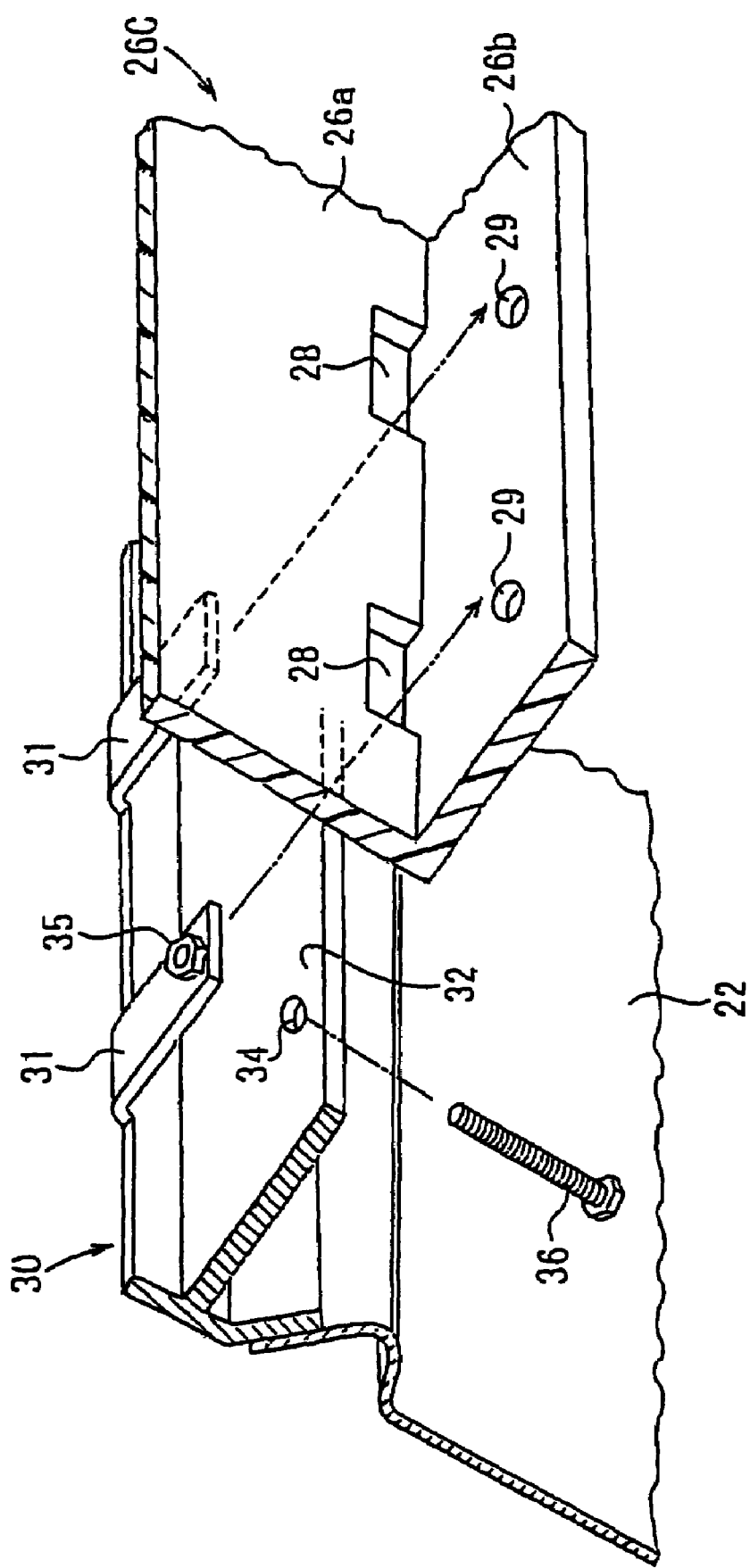
FIG. 3 is a perspective view showing the engaging relationship between a container of the airbag apparatus for a front passenger seat shown in FIG. 1 and a wall body of an instrument panel.
Figure 4:
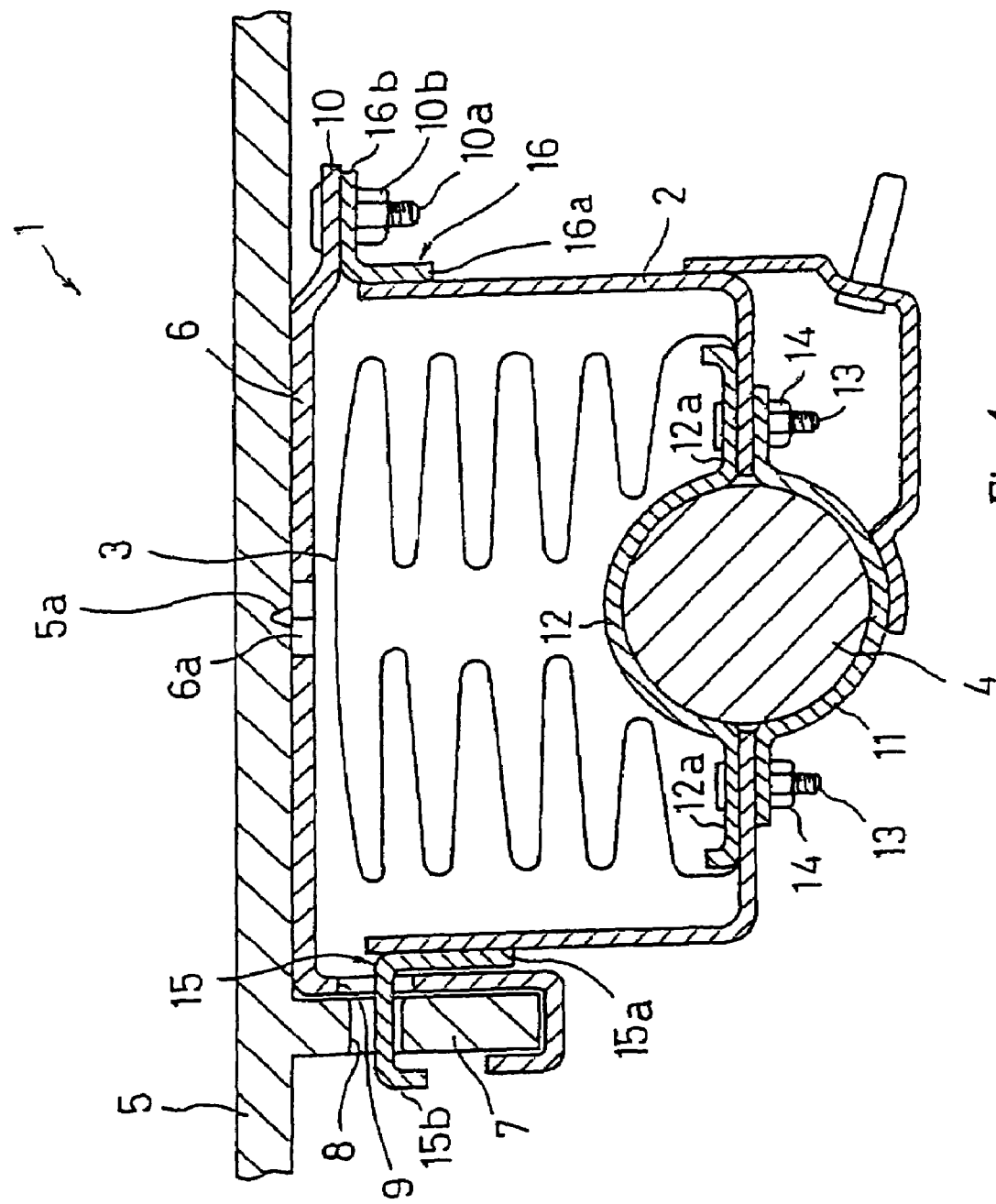
FIG. 4 is a sectional view of a conventional airbag apparatus for a front passenger seat and its setting structure.
Figure 5:
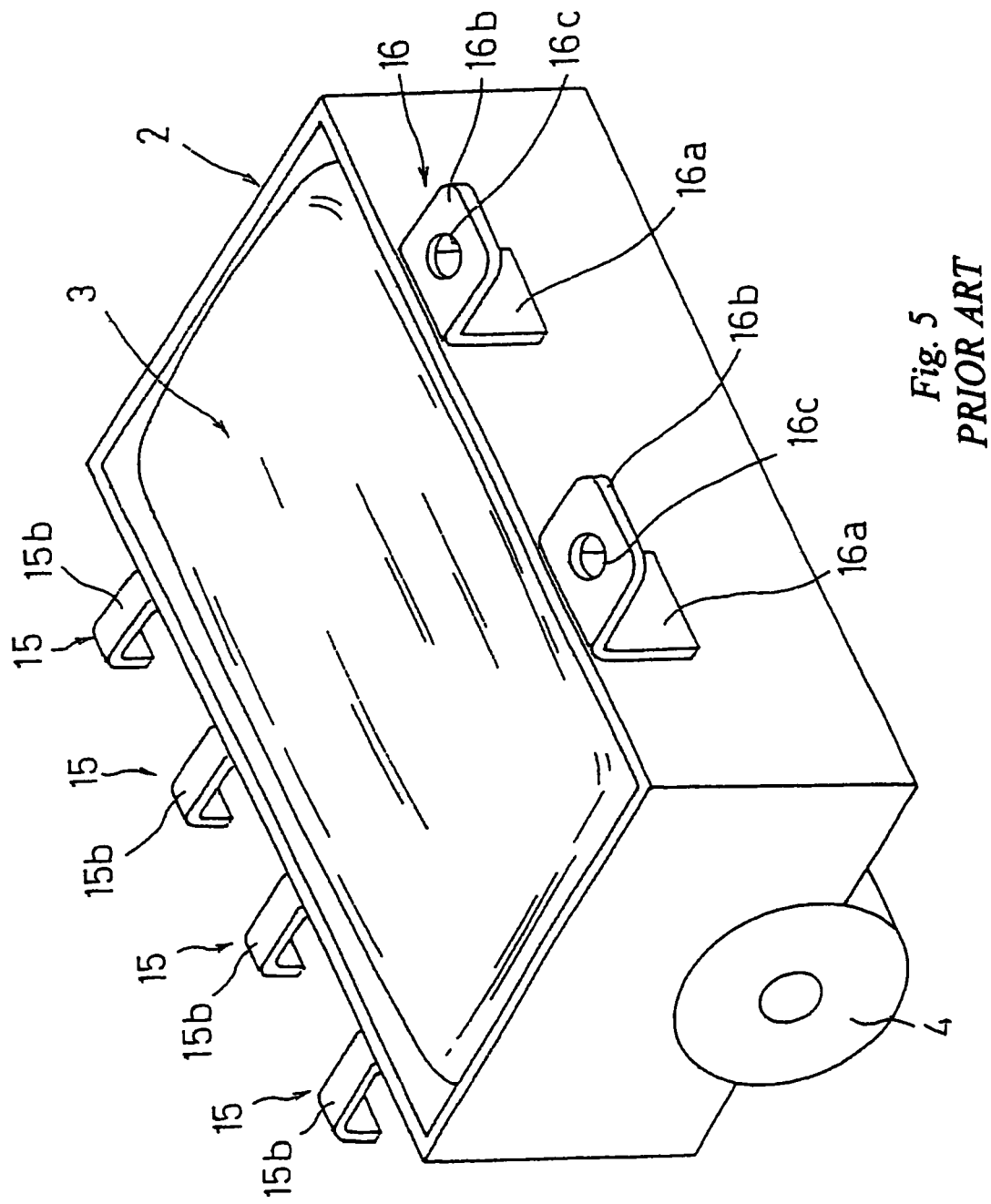
FIG. 5 is a perspective view of a container of the airbag apparatus for a front passenger seat shown in FIG. 4.
Figure 6:
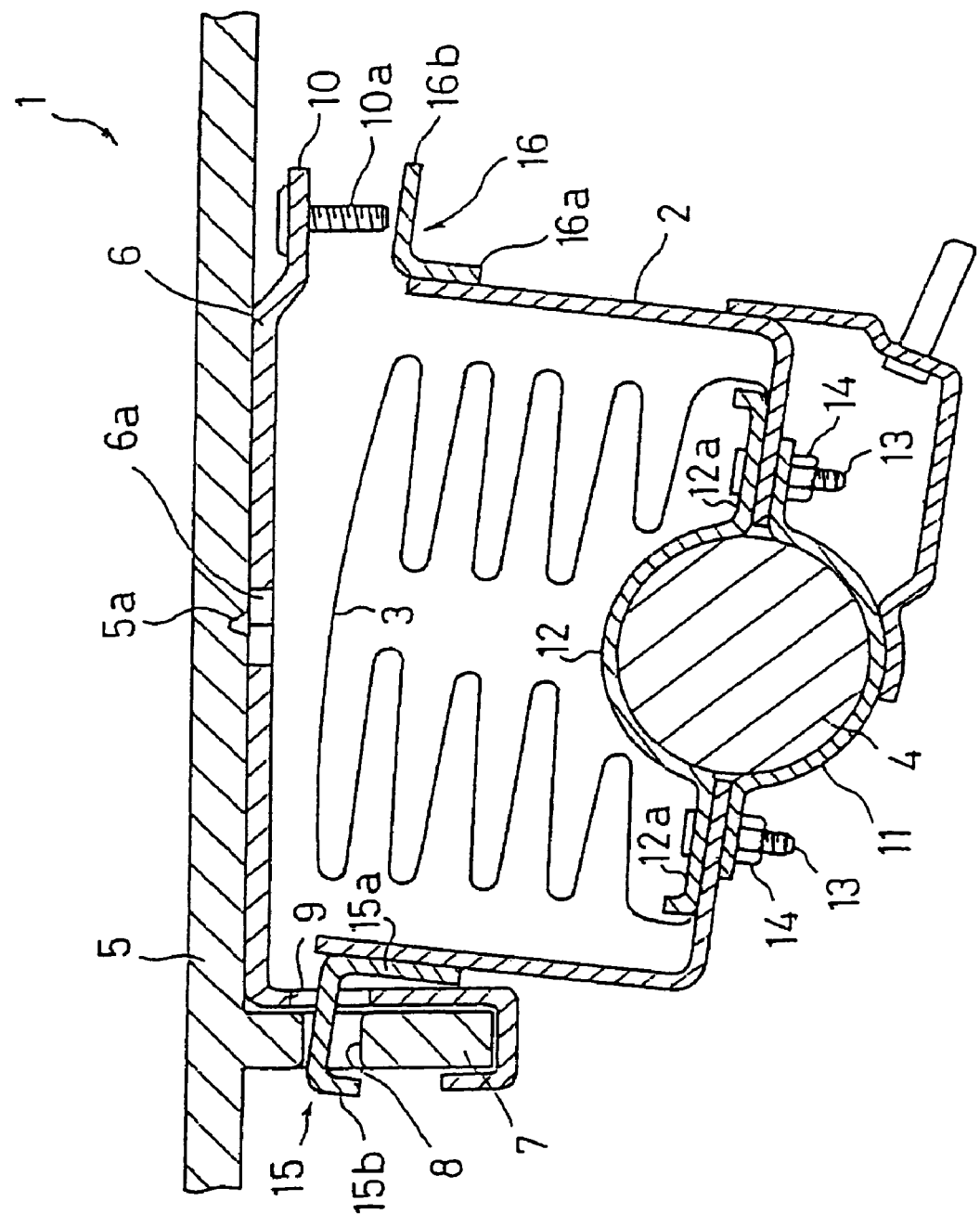
FIG. 6 is an explanatory view showing the engaging relationship between the airbag apparatus for a front passenger seat shown in FIG. 4 and the instrument panel.
Figure 7:
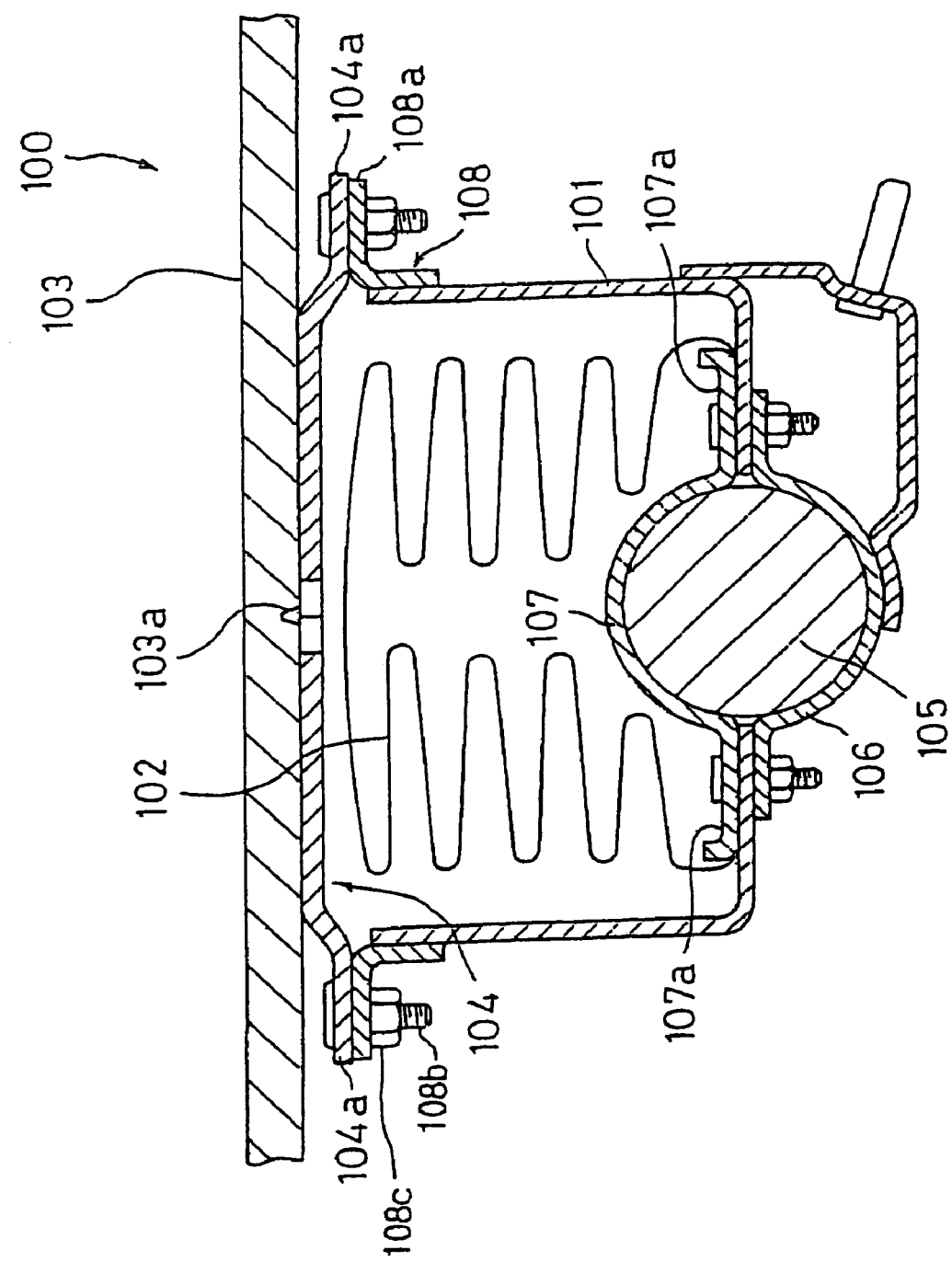
FIG. 7 is a sectional view of a conventional airbag apparatus for a front passenger seat and a setting structure thereof.

FIG. 1 is a longitudinal sectional view of an airbag apparatus for a front passenger seat showing the airbag apparatus for a front passenger seat and its setting structure to an instrument panel according to an embodiment of the present invention; FIG. 2 is an explanatory view for setting the airbag apparatus for a front passenger seat; and FIG. 3 is a perspective view showing the engaging relationship between part of a container of the airbag apparatus for a front passenger seat and a wall body of the instrument panel. In addition, an airbag is not shown in FIG. 2.

This airbag apparatus 21 for a front passenger seat includes a container 22 having a substantially rectangular shape in plan view, an airbag 23 folded and housed within the container 22, and a substantially cylindrical inflator 24 for inflating the airbag 23. The airbag 23 is connected to the bottom of the container 22 with an airbag-capping plate 23P arranged along the bottom surface of the container 22 therebetween.

On the backside of an instrument panel 25 covering an opening on the upper surface of the container 22, an attachment 26 for connecting the instrument panel 25 to the container 22 is bonded with an adhesive. In addition, on the backside of the instrument panel 25, a tearing line 25a is formed.

This attachment 26, having a substantially π-shaped section, includes a plate section 26A bonded on the bottom surface of the instrument panel 25 and wall sections 26B and 26C depending up from the plate section 26A. The attachment 26 is made of a synthetic resin in the same way as in the instrument panel 25. The attachment 26 is provided with a slit 26S formed at a position overlapping with the tearing line 25a. When the instrument panel 25 is cleaved along the tearing line 25a, the attachment 26 is deflected integrally with the instrument panel 25.

The wall section 26B is located adjacent to a windshield and is constituted of a plate depending substantially perpendicularly to the instrument panel 25. The wall section 26B is also provided with an opening 27 that is configured to receive a hook 41 of a retainer 40, which will be described later.

The wall section 26C is located at a position opposite to the wall section 26B with the container 22 therebetween (adjacent to an occupant). The wall section 26C includes a wall 26a depending from the plate section 26A substantially perpendicularly thereto and a leg piece 26b extended from the lower end of the depending wall 26a in a direction separating from the container 22. The depending wall 26a is provided with insertion openings 28 for upper pieces 31 of a clamp 30, which will be described as follows. The insertion openings 28 are open in a direction along the upper surface of the upper pieces 31. The leg piece 26b is provided with an insertion holes 29 for bolts 36, which will be described later.

The clamp 30 is joined to an edge of an opening of the container 22 arranged adjacent to an occupant by welding or the like. The clamp 30 includes the upper pieces 31 and a lower piece 32, which are extended toward the occupant in substantially parallel with each other. The upper pieces 31, each being a narrow band, are arranged above the lower piece 32 in the width direction of a vehicle body at intervals. A gap between each of the upper pieces 31 and the lower piece 32 is equal.

Each upper piece 31 and the lower piece 32 are provided with insertion holes 33 and 34 for the bolt 36, respectively. To each upper piece 31, a nut 35 is joined by welding or the like coaxially with the hole 33. In addition, the nuts 35 may be omitted so as to tap each hole 33 instead.

The retainer 40, arranged adjacent to a windshield, is joined to the container 22 by welding or the like at the lower portion. A U-shaped claw hook 41, which included a first sidewall 41a, a second sidewall 41b, and a bottom wall 41c that connects the two sidewalls 41a, 41b, protrudes from the top of the retainer 40 toward the windshield. The hook 41 and the upper and lower pieces 31 and 32 extend in directions separating from each other.

A stud bolt 51 is joined to a bracket 50 fixed on the external bottom surface of the container 22. With the bracket 50 and the stud bolt 51, the container 22 is fixed to a strength-burdening member of a vehicle body (not shown) therebetween.

The setting operation of the airbag apparatus 21 for a front passenger seat will be described below.

As shown in FIG. 2, the instrument panel 25 is mounted to a vehicle body in advance, and a glove box 60 is removed.

After the airbag apparatus 21 for a front passenger seat is fed in below the instrument panel 25, first, the upper pieces 31 are inserted into the openings 28 by clamping the leg piece 26b with the upper pieces 31 and the lower piece 32 therebetween. Then, the container 22 is pushed up toward a windshield and the retainer 40 is pushed up along the internal surface of the wall section 26B. The wall section 26B is elastically deflected toward the windshield.

When the container 22 is pushed up at a predetermined height, the hook 41 enters the opening 27 while the wall section 26B elastically restores the original shape.

Next, the bracket 50 is fixed to a vehicle body member with the stud bolt 51 therebetween. Simultaneously, the bolts 36 are screwed into the nuts 35 with the openings 34, 29, and 33 therebetween, so that the instrument panel 25 and the container 22 (the clamp 30) are connected together. Numeral 61 in FIG. 1 schematically denotes a tool for rotating the bolts 36. Thereafter, the glove box 60 is attached.

In the airbag apparatus 21 for a front passenger seat mounted on the back side of the instrument panel 25 in such a manner, upon vehicle collision, the inflator 24 ejects gas so as to inflate the airbag 23, so that the instrument panel 25 is cleaved along the tearing line 25a and the instrument panel 25 and the attachment 26 are integrally pushed open so as to largely extend the airbag 23 within a vehicle cabin.

In the airbag apparatus 21 for a front passenger seat structured in such a manner, upon fixing the instrument panel 25 to the container 22 with the bolts 36, since the leg piece 26b is inserted between the upper pieces 31 and the lower piece 32, the inserting operation of the bolts 36 into the openings 34, 29, and 33 is significantly easy. Also, the leg piece 26b is clamped with the upper pieces 31 and the lower piece 32, thereby sufficiently increasing a strength connecting between the instrument panel 25 and the container 22.

In order to remove the container 22 from the instrument panel 25, the glove box 60 is removed; then, the hook 41 is firstly withdrawn from the opening 27 after the bolts 36 are removed by contrast to FIG. 2; and next, the upper pieces 31 and the lower piece 32 are withdrawn from the leg piece 26b. Therefore, in a state that the instrument panel is mounted on a vehicle body as it is, the insertion and withdrawal of the container 22 can be easily performed.

In addition, if the openings 29 of the leg piece 26b are elongated or increased in diameter so as to be a loose holes, the instrument panel 25 can be positioned relative to the container 22.

As described above, according to an airbag apparatus for a front passenger seat and a setting structure of the airbag apparatus for a front passenger seat according to the present invention, setting and dismounting of a container to an instrument panel are easy. Even in a state that the instrument panel is installed on a vehicle, the container is detachable without dismounting the instrument panel from a vehicle body.

The priority application, Japanese Patent Application No. 2002-259074 filed on Sep. 4, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag apparatus for a front passenger seat of a vehicle comprising:
   a container that has a pair of opposing sides; and
   an airbag that is folded and accommodated within the container;
   wherein one of the pair of the opposing sides includes a locking part for connecting to a vehicle instrument panel and the other of the pair of opposing sides includes a fixing part for connecting to the instrument panel,
   wherein the fixing part includes two members that extend substantially in parallel with each other,
   wherein the fixing part is configured to receive a wall section that extends from a rear surface of the instrument panel between the two members,
   wherein the wall section includes at least one opening for insertion of one of the two substantially parallel members, and
   wherein the wall section includes a leg piece that extends in a direction substantially parallel to the instrument panel and away from the container.

2. The apparatus of claim 1, wherein the two members extend in a direction substantially perpendicular to the pair of opposing sides and away from the container.

3. The apparatus of claim 1, wherein the locking part is hook shaped.

4. The apparatus of claim 1, wherein the two members are connected together to form a clamp for the wall section.

5. A setting structure for an airbag apparatus for a front passenger seat of a vehicle having an instrument panel,
   wherein the airbag apparatus comprises:
      a container that has a pair of opposing sides; and
      an airbag that is folded and accommodated within the container,
   wherein the setting structure includes an arrangement wherein each of the opposing sides is connected to a backside of the instrument panel,
   wherein one of the opposing sides includes a clamp that has two parallel members that connect to a wall section of the instrument panel, which wall section extends toward the container,
   wherein the wall section includes at least one opening for insertion of one of the two parallel members, and
   wherein the wall section includes a leg piece that extends in a direction substantially parallel to the instrument panel and away from the container.

6. The structure of claim 5, wherein the leg piece is positioned between the two parallel members.

7. The structure of claim 6, wherein the leg piece is connected to the members by at least one bolt.

8. The structure of claim 5, wherein the other of the opposing sides includes a hook-shaped extension that connects with a downwardly extending portion of the instrument panel.

9. An airbag apparatus for a front passenger seat of a vehicle comprising:
   a container that has a pair of opposing sides; and
   an airbag that is folded and accommodated within the container;
   wherein one of the pair of the opposing sides includes a locking part for connecting to a vehicle instrument panel and the other of the pair of opposing sides includes a fixing part for connecting to the instrument panel,
   wherein the fixing part includes two substantially parallel, non-coplanar members that extend in a direction substantially parallel to the instrument panel and away from the container,
   wherein the fixing part is configured to receive a wall section that extends from a rear surface of the instrument panel between the two members,
   wherein the wall section includes at least one opening for insertion of one of the two substantially parallel members, and
   wherein the two members are connected together by a fastener to form a clamp for the wall section.

10. The apparatus of claim 9, wherein the two members extend in a direction substantially perpendicular to the pair of opposing sides and away from the container.

11. The apparatus of claim 9, wherein the locking part is hook shaped.

* * * * *